(12) United States Patent
Aldworth

(10) Patent No.: US 6,760,798 B1
(45) Date of Patent: Jul. 6, 2004

(54) INTERFACE MECHANISM AND METHOD FOR INTERFACING A REAL-TIME CLOCK WITH A DATA PROCESSING CIRCUIT

(75) Inventor: Peter James Aldworth, Cambridge (GB)

(73) Assignee: Arm Limited, Cambridge (GB)

( * ) Notice: Subject to any disclaimer, the term of this patent is extended or adjusted under 35 U.S.C. 154(b) by 578 days.

(21) Appl. No.: 09/616,067

(22) Filed: Jul. 13, 2000

(51) Int. Cl.$^7$ ........................ G06F 13/362; G06F 13/14; G06F 1/06; H03K 17/04
(52) U.S. Cl. .................... 710/118; 710/305; 710/58; 713/401; 713/500; 713/501; 327/119; 375/376
(58) Field of Search ................... 710/305, 58; 713/500; 370/516, 518, 347; 375/376; 368/156; 327/119

(56) References Cited

U.S. PATENT DOCUMENTS

| | | | | |
|---|---|---|---|---|
| 5,274,545 A | * | 12/1993 | Allan et al. ................. | 368/156 |
| 5,526,515 A | * | 6/1996 | Ross et al. .................. | 713/500 |
| 5,612,981 A | * | 3/1997 | Huizer ........................ | 375/376 |
| 5,719,510 A | * | 2/1998 | Weidner ...................... | 327/119 |
| 6,282,210 B1 | * | 8/2001 | Rapport et al. ............. | 370/518 |
| 6,449,291 B1 | * | 9/2002 | Burns et al. ................ | 370/516 |
| 6,516,362 B1 | * | 2/2003 | Magro et al. ................ | 710/58 |
| 6,560,215 B1 | * | 5/2003 | Bloem et al. ............... | 370/347 |

* cited by examiner

Primary Examiner—Glenn A. Auve
Assistant Examiner—Christopher E. Lee
(74) Attorney, Agent, or Firm—Nixon & Vanderhye P.C.

(57) ABSTRACT

The present invention relates to an interface mechanism and particularly to an interface mechanism for interfacing a real-time clock operating at a first frequency with a data processing circuit operating at a second frequency. The interface mechanism comprises a first input for receiving a relative real-time clock value from the real-time clock, and a second input for receiving an update value from the data processing circuit specifying a desired value for the real-time clock. Update logic is also provided for producing an absolute real-time clock value, the update logic being arranged in response to receipt of the update value to generate an offset value derived from the relative real-time clock value and the update value, the offset value then being applied to the relative real-time clock value to produce an updated absolute real-time clock value. The updated absolute real-time clock value is then output from the interface mechanism. This enables the update of the real-time clock to be performed very efficiently, without the need to perform any of the update procedure in the slow frequency domain of the real-time clock.

9 Claims, 6 Drawing Sheets

US 6,760,798 B1

INTERFACE MECHANISM AND METHOD FOR INTERFACING A REAL-TIME CLOCK WITH A DATA PROCESSING CIRCUIT

BACKGROUND OF THE INVENTION

1. Field of the Invention

The present relation relates to an interface mechanism and particularly to an interface mechanism for interfacing a real-time clock operating at a first frequency with a data processing circuit operating at a second frequency.

2. Description of the Prior Art

Many data processing circuits utilise real-time clocks to provide a real-time clock value indicating, for example, the current day, date and time. Typically, when the data processing circuit is first activated, the correct day, date and time may need to be set. When the data processing circuit is shut down, power is maintained to the real-time clock, usually by a battery, so that the real-time clock may continue to operate. However, the real-time clock value may need to be updated for various reasons such as, for example, any cumulative inaccuracies of the real-time clock, a change of time zones or the loss of power to the real-time clock. Hence, it is known to provide an interface mechanism for interfacing the real-time clock with a data processing circuit which allows the real-time clock value to be updated.

The real-time clock will generally operate at a low frequency of typically 1 Hz and may therefore provide an incremented real-time clock value to the data processing circuit once every second. The data processing circuit will often be operating at a different frequency to the real-time clock, for example 30 MHz, and hence the interface mechanism will often need to handle signals received at different frequencies.

FIG. 1 describes such a known interface mechanism. The interface mechanism, generally 100, interfaces a real-time clock, generally 110, with a data processing circuit 190. For clarity, signals issued in the data processing circuit frequency domain are annotated with the subscript f2, whilst signals issued in the real-time clock frequency domain are annotated with the subscript f1.

In overview, the data processing circuit 190 receives a real-time clock value $C_{f2}$ synchronised with the data processing circuit frequency and generated by the interface mechanism 100 in response to a real-time clock value $C_{f1}$ issued by the real-time clock 110. The data processing circuit 190 may issue an update value $W_{f2}$ and a control signal $CTL_{f2}$ to the interface mechanism 100 to update the real-time clock 110. The interface mechanism 100 then updates the real-time clock 110 and once the update is complete the real-time clock 110 issues an updated real-time clock value $C_{f1}$.

The configuration of the real-time clock 110 will now be described in more detail. The real-time clock 110 comprises a multiplexer 160, a register 170 an incrementer 180 and a clock generator (not shown) for generating a 1 Hz clock signal $CLK_{f1}$. The real-time clock 110 is clocked by the 1 Hz clock signal $CLK_{f1}$. The register 170 is coupled to the clock generator, the multiplexer 160 and the incrementer 180. The register 170 stores the real-time clock value representing, for example, a time and date. The register 170 receives the clock signal $CLK_{f1}$ from the clock generator and the output from the multiplexer 160. The output of the multiplexer 160 is loaded into, and output by, the register 170 each time the register 170 is clocked by the clock signal $CLK_{f1}$ (e.g. on the rising edge of the clock signal). The incrementer 180 receives the output of the register 170, increments the value by one and outputs the incremented value to the multiplexer 160. When the register 170 is next clocked, the incremented value will be loaded from the multiplexer 160 into the register 170 and output to the incrementer 180.

The multiplexer 160 allows the real-time clock value to be incremented or updated. The multiplexer 160 receives the output of the incrementer 180 at one input and the output from the interface mechanism 100 at the other input. The multiplexer 160 is controlled by a signal LOAD received from the interface mechanism 100. When the signal LOAD is asserted the multiplexer 160 outputs the value received from the interface mechanism 100, whilst when the signal LOAD is not asserted the multiplexer 160 outputs the value received from the incrementer 180. Hence, in the absence of the signal LOAD, the value in the register 170 is incremented every second and output as the real-time clock value $C_{f1}$. When the signal LOAD is asserted, the update value W from the interface mechanism 100 is loaded into the register 170 when clocked by the clock signal $CLK_{f1}$ and output as the updated the real-time clock value $C_{f1}$.

The configuration of the interface mechanism 100 will now be described in more detail. The interface mechanism 100 comprises a state machine 120, a register 130 and a register 140. The interface mechanism 100 is clocked by a clock signal $CLK_{f2}$. The state machine 120 is coupled to the data processing circuit 190, the real-time clock 110, the register 130 and the register 140. The state machine 120 controls the register 130, the register 140 and the multiplexer 160.

The state machine 120 receives the clock signal $CLK_{f2}$ and a control signal $CTL_{f2}$ from the data processing circuit 190. The state machine 120 monitors the clock signal $CLK_{f1}$ issued by the clock generator of the real-time clock 110. The state machine 120 will assert a signal LOAD1 to the register 130 and a signal LOAD2 to the register 140 in response to the control signal $CTL_{f2}$ indicating that an update should take place. The register 130 is coupled to the data processing circuit 190, the state machine 120 and the register 140. The register 130 receives the update value $W_{f2}$ from the data processing circuit 190.

When the signal LOAD1 is asserted the update value $W_{f2}$ will be loaded into, and output by, the register 130. The contents of register 130 are output to the register 140. The register 140 is coupled to the register 130, the state machine 120 and multiplexer 160 of the real-time clock 100. The register 140 receives the update value W from the register 130. When the signal LOAD2 is asserted the update value W will be loaded into, and output by, the register 140. The contents of register 140 are output to the multiplexer 160.

Sync logic 150 is coupled to the output of the register 170 and to the data processing circuit. Sync logic receives the real-time clock value $C_{f1}$ output from the register 170 at the frequency $f_1$ and transforms this to a real-time clock value $C_{f2}$ having the same value but synchronised with the frequency $f_2$.

The operation of the interface mechanism 100 and real-time clock illustrated in FIG. 1 will now be described in more detail with reference also to FIG. 2.

During normal operation of the real-time clock 110, the register 170 may be activated with a value representing a time, day and date which is output as the real-time clock value $C_{f1}$. The real-time clock value $C_{f1}$ n is transformed by the sync logic 150 and output as a real-time clock value $C_{f2}$ which is received by the data processing circuit 190. As mentioned earlier, the real-time clock value $C_{f1}$, is incremented every second when the register 170 is clocked by the clock signal $CLK_{f1}$.

The real-time clock value $C_{f1}$ may be updated by the interface mechanism 100 in response to signals issued by the data processing circuit 190.

In order to initiate the update of the real-time clock 110, a control signal $CTL_{f2}$ and an update value $W_2$ are issued by the data processing circuit 190 to the state machine 120 shortly after a rising edge of the clock signal $CLK_{f2}$. In response, the state machine 120 issues a signal LOAD1 to the register 130. The register 130 will then load and output the update value $W_{f2}$ when clocked by the next clock signal $CLK_{f2}$.

The state machine 120 will then determine the state of the signal LOAD. If the signal LOAD is asserted then this indicates that a previous update of the real-time clock 110 has not yet completed. Assuming the signal LOAD is not asserted, then shortly after the rising edge of the next clock signal $CLK_{f2}$ the state machine 120 issues a signal LOAD2 to the register 140 as indicated in FIG. 2. The register 140 will then, when clocked by the clock signal $CLK_{f2}$, load and output the update value W which is presented as an input to the multiplexer 160. If the signal LOAD is asserted, then the state machine 120 will wait until the signal LOAD is not asserted before issuing the signal LOAD2.

Assume that prior to the issue of the control signal $CTL_{f2}$ indicating that an update should take place, the real-time clock value $C_{f1}$ has the value X. As described above, in the absence of the signal LOAD, the value output by the multiplexer 160 will be X+1. The state machine 120 and the register 170 wait until the next clock signal $CLK_{f1}$ is received from the clock generator. On the rising edge of the clock signal $CLK_{f1}$, the register 170 loads the output of the multiplexer 160 and the real-time clock value $C_{f1}$ has the value X+1. The output of the register 170 is incremented by the incrementer 180 and presented to the multiplexer 160 which, in the absence of the signal LOAD, outputs a value of X+2.

Once the state machine 120 has received the clock signal $CLK_{f1}$, it knows that it is now safe to issue the signal LOAD to the multiplexer 160 without the risk of conflicting with the increment operation of the real-time clock 110, and hence the state machine 120, on the rising edge of the next clock signal $CLK_{f2}$ following the clock signal $CLK_{f1}$, asserts and holds the signal LOAD to the multiplexer 160.

Accordingly, the update value W is presented as the output of the multiplexer 160. On the rising edge of the next clock signal $CLK_{f1}$, the update value W is loaded into the register 170 and the real-time clock value $C_{f1}$ has the value W. The output of the register 170 is incremented and presented to the multiplexer 160 which, due to the continued assertion of the signal LOAD still outputs the value W. On the rising edge of the next clock signal $CLK_{f2}$ after the clock signal $CLK_{f1}$, the state machine 120 stops asserting the signal LOAD to the multiplexer 160 since the reception of the clock signal $CLK_{f1}$ by the state machine 120 indicates that the update has completed, and the multiplexer 160 then outputs the value W+1.

Hence, the period between when the control signal $CTL_{f2}$ is first issued and the real-time clock value $C_{f1}$ has the updated value W is between one and two seconds. This latency between the update being requested and the update value being output is undesirable because the circuitry must operate for over a second after the write has been initiated to ensure correct operation. In situations where the circuitry loses power due to accidental or intentional power down during the update the status of the real-time clock may be unclear, at worst the update may not occur.

One possible solution to reduce the latency problem would be to provide certain circuit elements which could be clocked at either of the two frequencies, for example register 170 could be designed to be clocked at either frequency. However, it will be appreciated by those skilled in the art that this approach is likely to lead to reusability problems.

Thus an interface mechanism is required which can reduce the latency effect and effect the update in a shorter time period without affecting reusability.

SUMMARY OF THE INVENTION

According to a first aspect of the present invention there is provided an interface mechanism for interfacing a real-time clock operating at a first frequency with a data processing circuit operating at a second frequency comprising a first input for receiving a relative real-time clock value from the real-time clock; a second input for receiving an update value from the data processing circuit specifying a desired value for the real-time clock; update logic for producing an absolute real-time clock value, the update logic being arranged in response to receipt of the update value to generate an offset value derived from the relative real-time clock value and the update value, the offset value then being applied to the relative real-time clock value to produce an updated absolute real-time clock value, and an output for issuing the updated absolute real-time clock value.

Hence, the latency problem is reduced as a real-time clock value may be updated much more quickly, typically in less than two cycles of the second frequency. This increased speed is achieved by removing the need to write the update value to the real-time clock, the entire update process instead occurring in the second frequency domain. In accordance with the invention, the interface mechanism operating at the data processing circuit frequency generates an offset value derived from the relative real-time clock value and the update value. When the relative real-time clock value is received by the interface mechanism, this offset value is applied to the relative real-time clock value to produce the updated absolute real-time clock value for outputting to the data processing circuit.

Preferably, the offset value is derived by calculating the difference between the relative real-time clock value and the update value; and the updated absolute real-time clock value is produced by calculating the difference between the relative real-time clock value and the offset value.

Hence, the offset value will only need to be calculated each time that an update is requested by the data processing circuit. Once the offset value has been calculated it can be applied to a changing relative real-time clock value to produce a correct updated absolute real-time clock value.

Preferably, the update logic further comprises a first arithmetic unit for generating the offset value by subtracting the update value from the relative real-time clock value; and a second arithmetic unit for generating the updated absolute real-time clock value by subtracting the offset value from relative the real-time clock value.

Hence, the offset value and the updated absolute real-time clock value may be generated by a simple arithmetic subtraction operation, both operations being relatively quick to perform.

Preferably, the update logic is triggered to perform an update of the absolute real-time clock value in response to a control signal received from the data processing circuit in addition to the update value the offset value being derived in a second frequency clock cycle following receipt of the control signal, and the updated absolute real-time clock value being produced in the next occurring second frequency clock cycle.

Hence, the data processing circuit may indicate to the interface mechanism when an update is required. This allows a data bus to be used to issue the update value to the interface mechanism, and once the update value has been received by the interface mechanism the data bus is then available for other operations.

Preferably, the update logic further comprises a state machine for receiving the control signal and a second frequency clock signal wherein: in response to the control signal, a first signal is issued by the state machine during a first second frequency clock cycle to cause the first arithmetic unit to generate the offset value, and in response to the next occurring second frequency clock cycle, a second signal is issued by the state machine causing the second arithmetic unit to generate the updated absolute real-time clock value.

Hence, the state machine may control the generation of the offset value and the updated absolute real-time clock value. The state machine initiates the generation of the offset value by the first arithmetic unit during a first clock cycle in response to the control signal received from the data processing circuit. On the next occurring clock cycle, which allows time for the offset value to be generated by the first arithmetic unit, the updated absolute real-time clock value is generated.

Preferably, the update logic further comprises: a first register for storing and outputting to the first arithmetic unit the update value from the data processing circuit in response to the first signal from the state machine; and a second register for storing and outputting to the second arithmetic unit the offset value generated by the first arithmetic unit in response to the second signal.

Hence, by storing the updated value the data processing circuit may be decoupled from the interface mechanism, thereby allowing the data processing circuit to perform other operations. Also, by storing the offset value, this value need not be recalculated each time the updated absolute real-time clock value is generated.

Preferably, the interface mechanism further comprises sync logic for synchronising the relative real-time clock value generated by the real-time clock with the second frequency, wherein the update logic receives the resynchronised relative real-time clock value.

Hence, the update logic may be provided with the relative real-time clock value synchronised with the frequency used by the data processing circuit.

According to a second aspect of the present invention there is provided a method of interfacing a real-time clock operating at a first frequency with a data processing circuit operating at a second frequency, comprising the steps of, receiving a relative real-time clock value from the real-time clock; receiving an update value from the data processing circuit specifying a desired value for the real-time clock; producing an updated absolute real-time clock value by generating an offset value derived from the relative real-time clock value and the update value and by applying the offset value to the relative real-time clock value; and issuing the updated absolute real-time clock value.

According to a third aspect of the present invention there is provided a computer-readable medium having stored thereon a plurality of instructions, the plurality of instructions including instructions which, when executed by an interface mechanism, cause the interface mechanism to implement a method for interfacing a real-time clock operating at a first frequency with a data processing circuit operating at a second frequency the method comprising the steps of: receiving a relative real-time clock value from the real-time clock; receiving an update value from the data processing circuit specifying a desired value for the real-time clock; producing an updated absolute real-time clock value by generating an offset value derived from the relative real-time clock value and the update value and by applying the offset value to the relative real-time clock value; and issuing the updated absolute real-time clock value.

BRIEF DESCRIPTION OF THE DRAWINGS

An embodiment of the invention will be described hereinafter, by way of example only with reference to the accompanying drawings in which like reference signs are used for like features, and in which.

DESCRIPTION OF A PREFERRED EMBODIMENT

Figure 1:
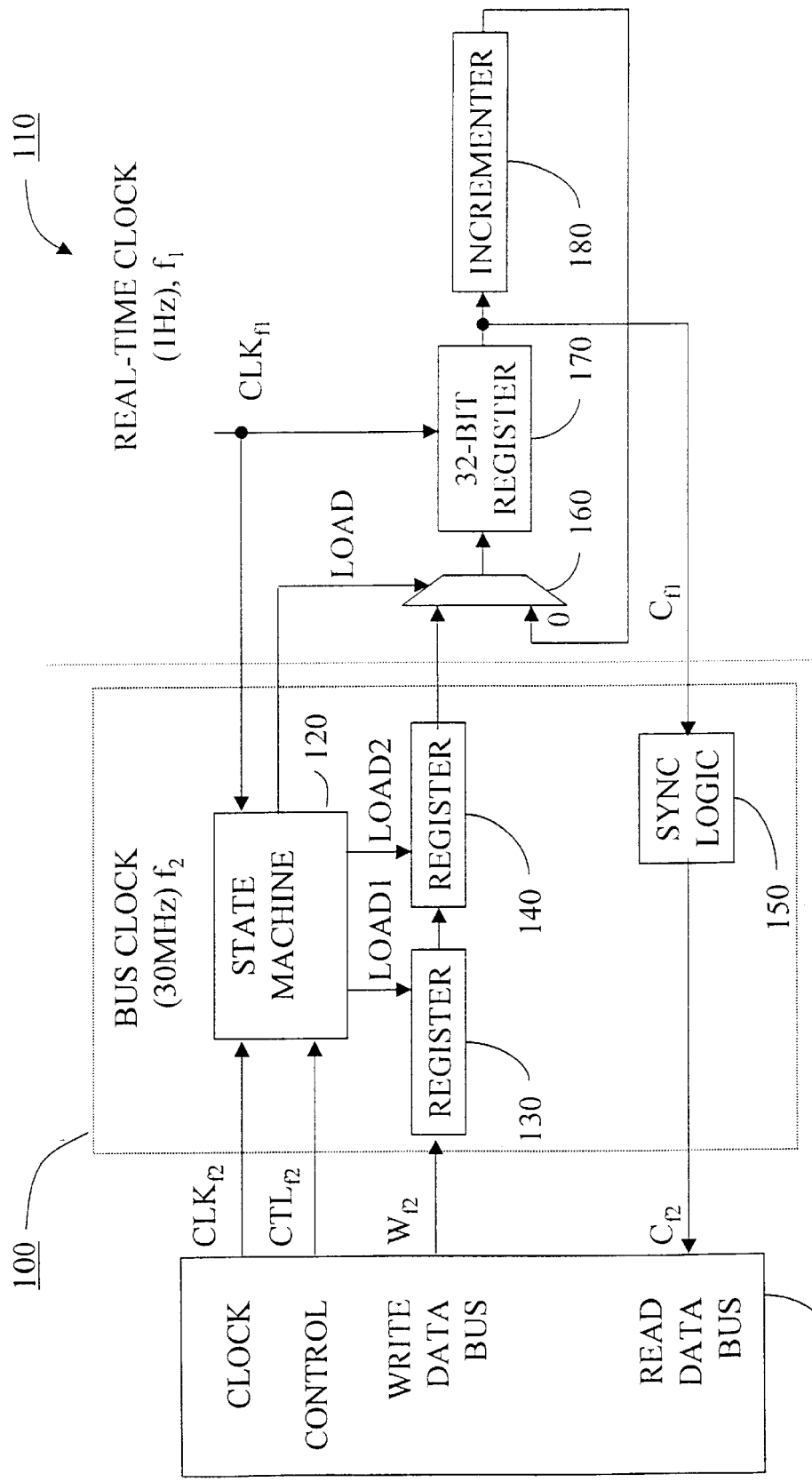
FIG. 1 is a block diagram of an interface mechanism coupled to a data processing circuit and a real-time clock according to a prior art technique.
Figure 2:
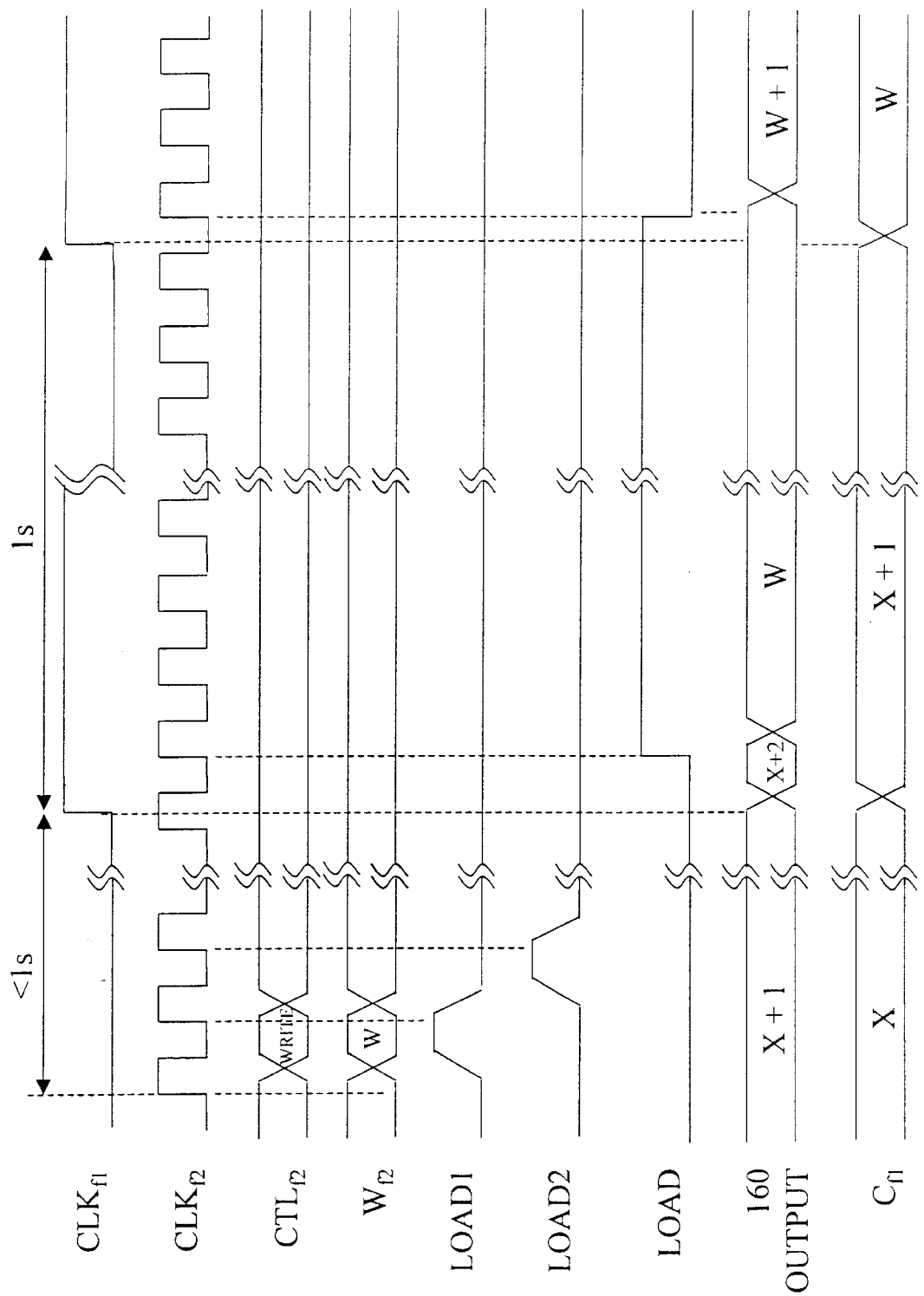
FIG. 2 is a timing diagram of an update operation performed using the apparatus of FIG. 1.
Figure 3:
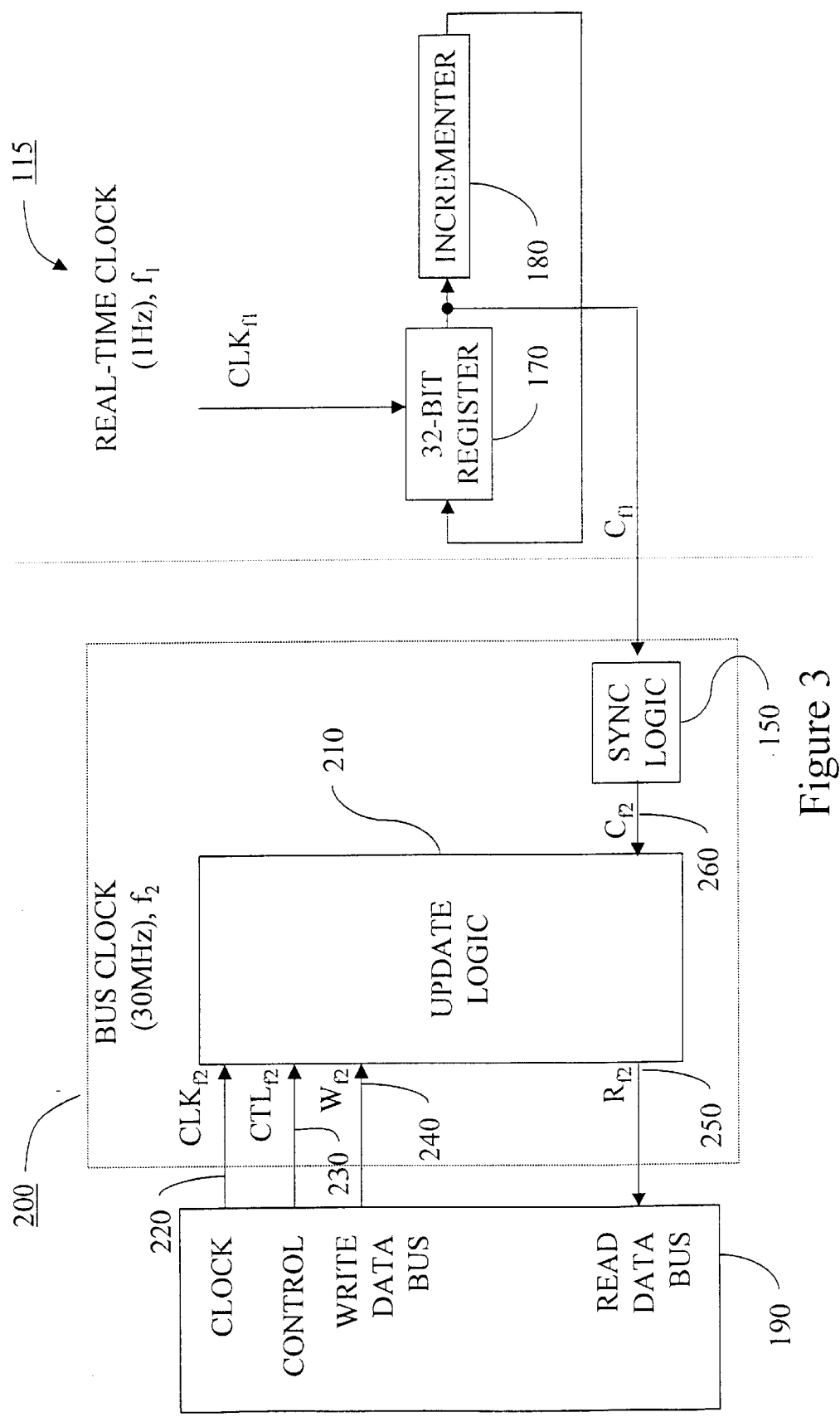
FIG. 3 is a block diagram of an interface mechanism in accordance with a preferred embodiment of the invention coupled to the data processing circuit and the real-time clock.

FIG. 3 shows an interface mechanism according to an embodiment of the present invention. The interface mechanism, generally 200, interfaces a real-time clock, generally 115, with the data processing circuit 190. In overview, the update logic 210 receives a relative real-time clock value $C_{f2}$ from the real-time clock 115 via the sync logic 150 and outputs an updated absolute real-time clock value $R_{f2}$. The data processing circuit 190 may issue an update value $W_{f2}$ to the update logic 210. The update logic 210 updates the absolute real-time clock value $R_{f2}$ based on the update value W and in response to a control signal $CTL_{f2}$ received from the data processing circuit 190. Once the update is complete the update logic 210 issues the updated 25 absolute real-time clock value $R_{f2}$.

The configuration of the real-time clock 115 will be now be described in more detail. The real-time clock 115 comprises a register 170, an incrementer 180 and a clock generator (not shown) for generating a clock signal $CLK_{f1}$. The register 170 is coupled to the incrementer 180 and the clock generator. The register 170 stores the relative real-time clock value $C_{f1}$. The register 170 receives the clock signal $CLK_{f1}$ from the clock generator and outputs the relative real-time clock value $C_{f1}$. The incrementer 180 receives the output of the register 170, increments the value by one and outputs the incremented value. The register 170 receives the output of the incrementer 180. Hence, the value of the register 170 is incremented once every second and output as the relative real-time clock value $C_{f1}$. The real-time clock 115 differs from the real-time clock 110, described above, through the absence of the multiplexer 160. Hence, it is not possible to externally load a real-time clock value into the register 170. Instead, the register 170 is initialised with a predetermined value when first activated and is then free-running from that point on.

The configuration of the interface mechanism 200 will now be described in more detail. The interface mechanism 200 comprises update logic 210 and sync logic 150. The update logic 210 is coupled to the data processing circuit 190 and to the real-time clock 115 via the sync logic 150. The update logic 210 has a first input. 260 for receiving the relative real-time clock value $C_{f2}$ from the sync logic 150, a second input 240 for receiving the update value $W_{f2}$ from the data processing circuit 190, a third input 220 for receiving the clock signal $CLK_{f2}$ from the data processing circuit 190, a fourth input 220 for receiving the control signal $CTL_{f2}$ from the data processing circuit 190 and an output 250 for issuing the updated absolute real-time clock value $R_{f2}$.

Sync logic 150 is coupled to the output of the register 170 and to the update logic 210. Sync logic 150 receives the relative real-time clock value $C_{f1}$ output from the register 170 at the frequency $f_1$ and transforms this to the relative real-time clock value $C_{f2}$ having the same value but synchronised with the frequency $f_2$.

The operation of the interface mechanism 200 illustrated in FIG. 3 will now be described in more detail.

As mentioned earlier, the real-time clock 115 is initialised with a predetermined value (e.g. set to zero) when the data processing circuit 190 is first activated, and this value is then incremented every second and output as the relative real-time clock value $C_{f1}$.

The relative real-time clock value $C_{f1}$ is transformed by the sync logic 150 and output as the relative real-time clock value $C_{f2}$ which is synchronised with the frequency $f_2$ and received at the first input 260 of the update logic 210. This relative real-time clock value $C_{f2}$ is then converted to the absolute real-time clock value $R_{f2}$ by the update logic 210 as discussed below.

To set the real-time clock to a desired value, an updated absolute real-time clock value $R_{f2}$ may be derived by the interface mechanism 200 from the relative real-time clock value $C_{f2}$ in response to signals issued by the data processing circuit 190. The update logic 210 may receive an update value $W_{f2}$ from the data processing circuit 190 which specifies a desired update value for the absolute real-time clock value $R_{f2}$. The update logic 210 then produces the updated absolute real-time clock value $R_{f2}$ by generating an offset value derived from the relative real-time clock value $C_{f2}$ and the update value W, the offset value being applied to the relative real-time clock value $C_{f2}$ to produce the updated absolute real-time clock value $R_{f2}$. The updated absolute real-time clock value $R_{f2}$ is then output over path 250 to the data processing circuit 190. These functions of the update logic 210 may be implemented in software or hardware.

In order to initiate the update of the absolute real-time clock value $R_{f2}$ a control signal $CTL_{f2}$, indicating that a update should take place, and an update value $W_{f2}$ are issued by the data processing circuit 190 and are captured by the update logic 210 via the fourth and second inputs 230, 240, respectively, on the rising edge of the clock signal $CLK_{f2}$.

The update logic 210, in response to the next rising edge of the clock signal $CLK_{f2}$, generates an offset value D which is derived from the relative real-time clock value $C_{f2}$ and the update value W. The offset value D is then applied, in response to the next rising edge of the clock signal $CLK_{f2}$, to the relative real-time clock value $C_{f2}$ to produce the updated absolute real-time clock value $R_{f2}$.

Accordingly, the absolute real-time clock value $R_{f2}$ may be updated without needing to load the real-time clock 115 with a new value. This avoids the need to process the update at the lower frequency $f_1$, and instead the updated absolute real-time clock value $R_{f2}$ may be generated based on the higher frequency $f_2$, and thus may be generated more quickly than in the prior art. Also, since no element in the design needs to be clocked by more than one clock source, there are no reusability problems.

Figure 4:
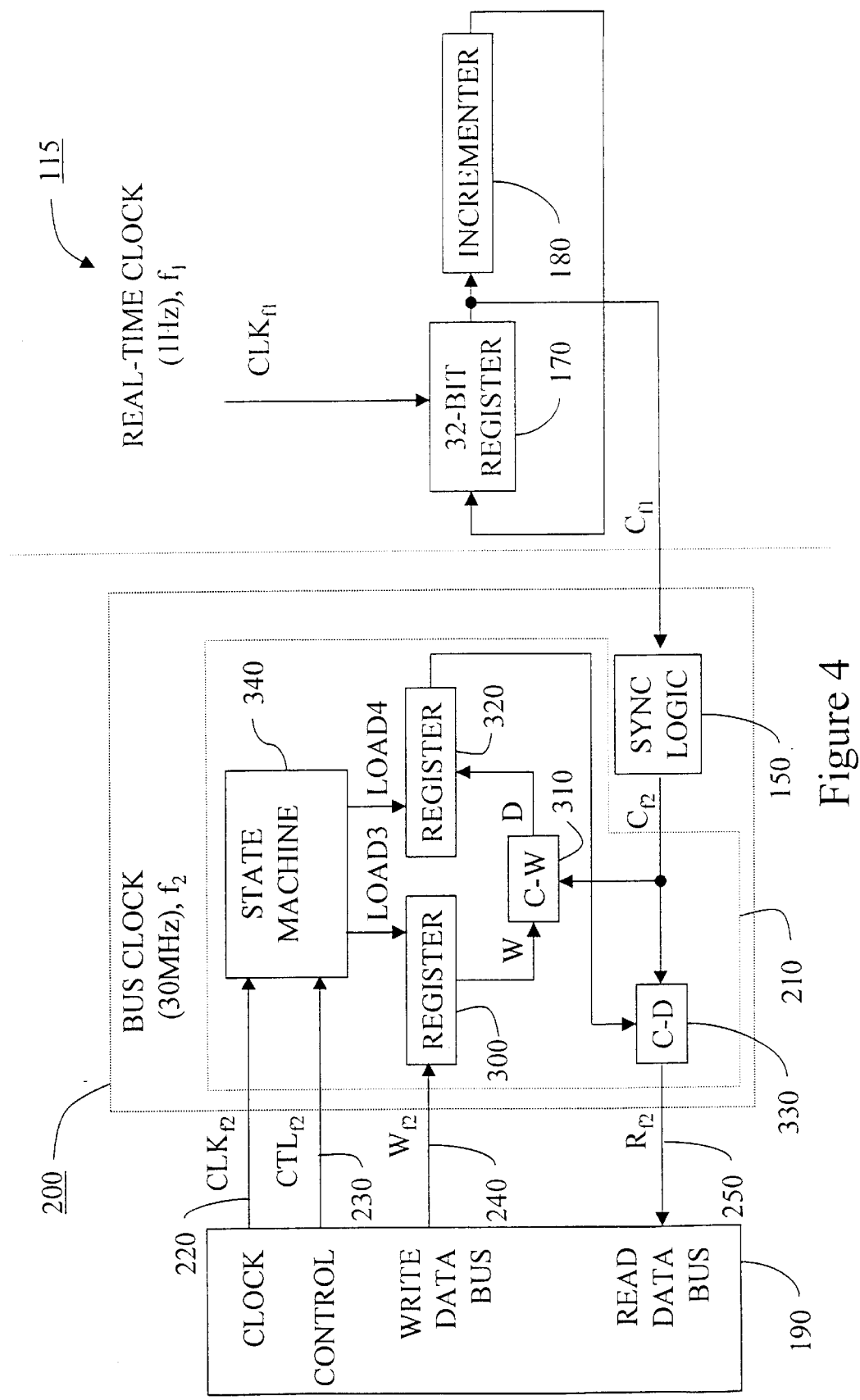
FIG. 4 is a block diagram of an interface mechanism in accordance with an embodiment of the invention coupled to the data processing circuit and the real-time clock.

FIG. 4 shows one possible hardware configuration for the update logic 210, although as mentioned earlier the update logic function may alternatively be implemented in software. The update logic 210 comprises a state machine 340, a first register 300, a second register 320, a first arithmetic unit 310 and a second arithmetic unit 330.

The state machine 340 is coupled to the data processing circuit 190, the first register 300 and the second register 320. The state machine 340 receives the clock signal $CLK_{f2}$ and the control signal $CTL_{f2}$ from the data processing circuit 190. The state machine 340 is arranged to issue a signal LOAD3 to the first register 300 and a signal LOAD4 to the second register 320. The first register 300 is coupled to the state machine 340 and to the data processing circuit 190. The first register 300 receives the update value $W_{f2}$ from the data processing circuit 190 and a signal LOAD3 from the state machine 330. The first register 300 then stores and outputs the update value $W_{f2}$ to the first arithmetic unit 310 when clocked by the clock signal $CLK_{f2}$. The first arithmetic unit 310 receives the update value W from the first register 300 and the real-time clock value $C_{f2}$ from the sync logic 150. The first arithmetic unit 310 then determines an offset value D and outputs it to the second register 320. The second register 320 receives a signal LOAD4 from the state machine 340 and the offset value D from the first arithmetic unit 310. The register 320 then stores and outputs the offset value D to the second arithmetic unit 330 when clocked by the clock signal $CLK_{f2}$. The second arithmetic unit 330 receives the offset value D from the second register 320 and the real-time clock value $C_{f2}$ from the sync logic 150. The second arithmetic unit 330 then determines and outputs the updated absolute real-time clock value $R_{f2}$ to the data processing circuit 190.

The operation of the update logic 210 illustrated in FIG. 4 will now be described in more detail with reference also to FIG. 5.

Upon initiation of the data processing circuit 190, the real-time clock 115 is preferably set to zero and the absolute real-time clock value $R_{f2}$ output by the update logic 210 prior to an update being requested by the data processing circuit 190 has the same value as the relative real-time clock value $C_{f2}$.

The absolute real-time clock value $R_{f2}$ may be updated by the update logic 210 in response to signals issued by the data processing circuit 190.

In order to initiate the update of the absolute real-time clock value $R_{f2}$, a control signal $CTL_{f2}$, indicating that an update should take place is issued to the state machine 340, and an update value $W_{f2}$, is issued by the data processing circuit 190 to the register 300 on the rising edge of the clock signal $CLK_{f2}$. Preferably, the state machine 340 then issues a signal LOAD3 to the first register 300, which then stores and outputs the update value W when clocked by the clock signal $CLK_{f2}$.

The contents of the register 300 and the relative real-time clock value $C_{f2}$ are received by the first arithmetic unit 310 which calculates an offset value D which is then issued to the second register 320. In the next clock cycle, the state machine 340 issues a signal LOAD4 to the second register 320, which then stores and outputs the offset value D when clocked by the clock signal $CLK_{f2}$. The contents of the second register 320 and the relative real-time clock value $C_{f2}$ are then received by the second arithmetic unit 330 which then applies the offset value D to the relative real-time clock value $C_{f2}$ to produce the updated absolute real-time clock value $R_{f2}$. The updated absolute real-time clock value $R_{f2}$ is issued to the data processing circuit 190.

It will be appreciated by those skilled in the art that there is no requirement for the state machine 340 to issue the signal LOAD3, since alternatively the contents of first register 300 could be arranged to be updated on every occurrence of the clock signal $CLK_{f2}$. This would not cause a problem, as long as the register 320 continues to only be updated when the new offset value D is calculated on occurrence of the update.

The first arithmetic unit derives the offset value D by calculating the difference between the relative real-time clock value $C_{f2}$ and the update value W, in this case calculated by subtracting the update value W from the relative real-time clock value $C_{f2}$. The second arithmetic unit 330 produces the updated absolute real-time clock value $R_{f2}$ by calculating the difference between the relative real-time clock value $C_{f2}$ and the offset value D, in this case by subtracting the offset value D from the relative real-time clock value $C_{f2}$.

Hence, the offset value D is only calculated each time that an update is requested. The main purpose of the register 300 is to allow for late arrival of the update value $W_{f2}$ on the data bus (i.e. it is there for timing reasons). The subtraction in the first arithmetic unit 310 needs some time to complete before the offset value D is sampled by the register 320. In addition, by storing the update value W in the first register 300 the data processing circuit 190 may be decoupled from the interface mechanism thereby allowing the data processing circuit 190 to perform other operations. By storing the offset value D in the second register 320, the offset value D may thereafter be applied to a changing relative real-time clock value $C_{f2}$ to produce the updated absolute real-time clock value $R_{f2}$.

Figure 5:
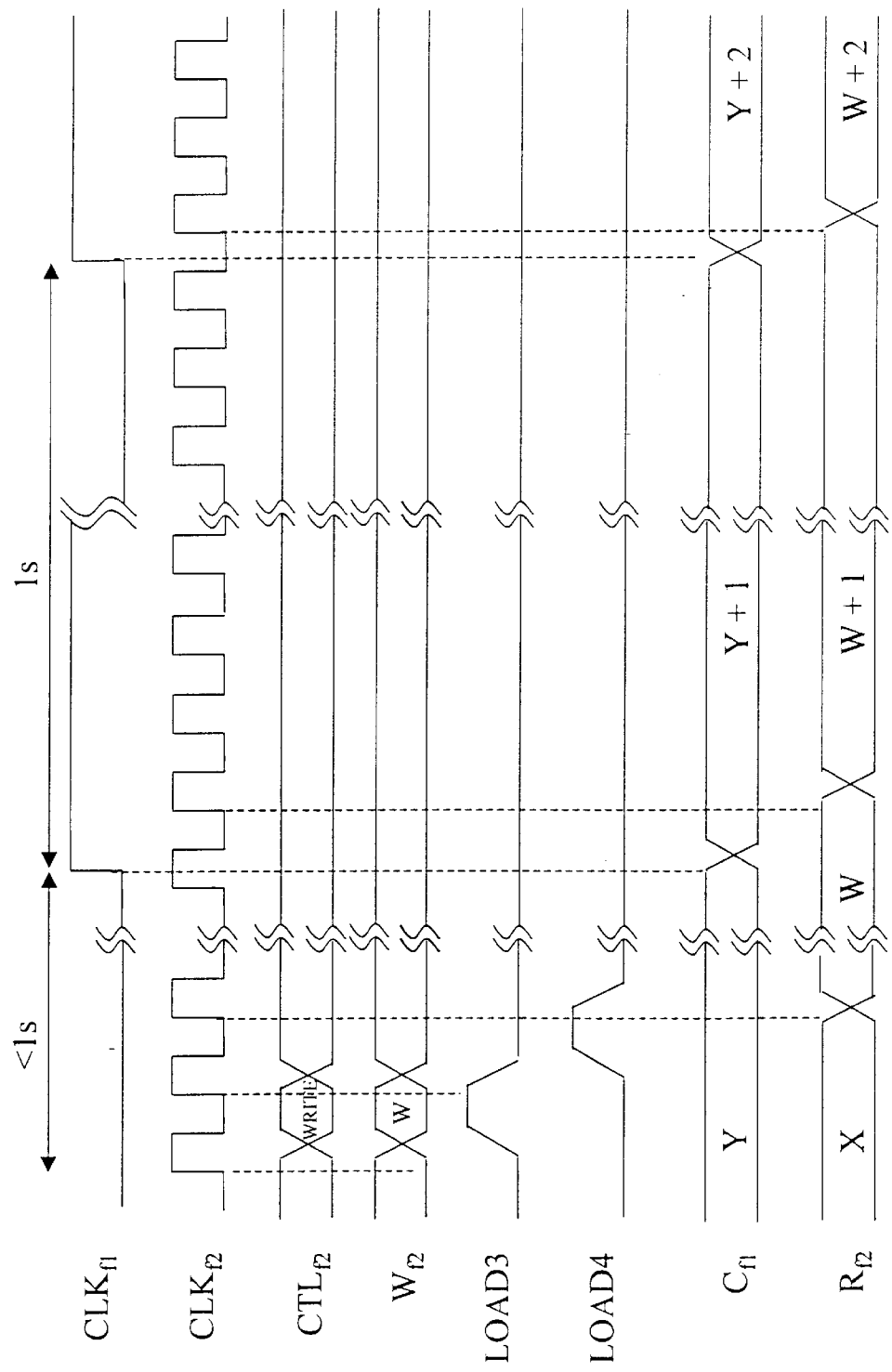
FIG. 5 is a timing diagram of an update operation performed using the interface mechanism of FIG. 4.

As can be seen in FIG. 5 assume that the relative real-time clock value $C_{f1}$ has the value Y and the absolute real-time clock value $R_{f2}$ has the value X. In order to initiate the update of the absolute real-time clock value $R_{f2}$ the data processing circuit 190 issues a control signal $CTL_{f2}$ indicating that an update is to take place and an update value $W_{f2}$, shortly after a rising edge of the clock signal $CLK_{F2}$. The state machine 120 in response then issues a signal LOAD3 to the first register 300. On the rising edge of the next clock signal $CLK_{f2}$ the register 300 stores and outputs the update value W and the state machine 340 issues a signal LOAD4 to the second register 320. The first arithmetic unit 310 subtracts the real-time clock value $C_{f2}$ from the update value W to produce an offset value D. Until this point the update logic 210 continues to output the absolute real-time clock value $R_{f2}$ having the value X. On the rising edge of the next clock signal $CLK_{f2}$ the register 320 stores and outputs the offset value D and the second arithmetic unit 330 subtracts the offset value D from the relative real-time clock value $C_{f2}$ to produce the updated absolute real-time clock value $R_{f2}$ having the value W.

Hence it can be seen that two clock cycles $CLK_{f2}$ after an update is requested, the updated absolute real-time clock value $R_{f2}$ has the value W, although the relative real-time clock value $C_{f1}$ remains unchanged, having a value Y.

On occurrence of the next clock signal $CLK_{f1}$ the relative real-time clock value $C_{f1}$ will have the value Y+1 and the updated absolute real-time clock value $R_{f2}$ will be updated to have the value of W+1 on the rising edge of the next clock signal $CLK_{f2}$.

Advantageously, the absolute real-time clock value $R_{f2}$ can be updated much more quickly than in the prior art. Hence, in situations where the circuitry loses power due to accidental or intentional power down during the update, the status of the real-time clock is likely to be more predictable and with the update more likely to have occurred.

Also, since all of the elements of the interface mechanism 200 and the real-time clock 115 are clocked only at one frequency, there are no reusability problems.

Additionally, whilst the interface between the update logic 210 and the data processing circuit 190 remains unchanged, the interface between the real-time clock and the update logic 210 is significantly simplified.

Furthermore, the functionality required from the real-time clock is also significantly simplified since it no longer requires any elements which perform an update operation.

Figure 6:
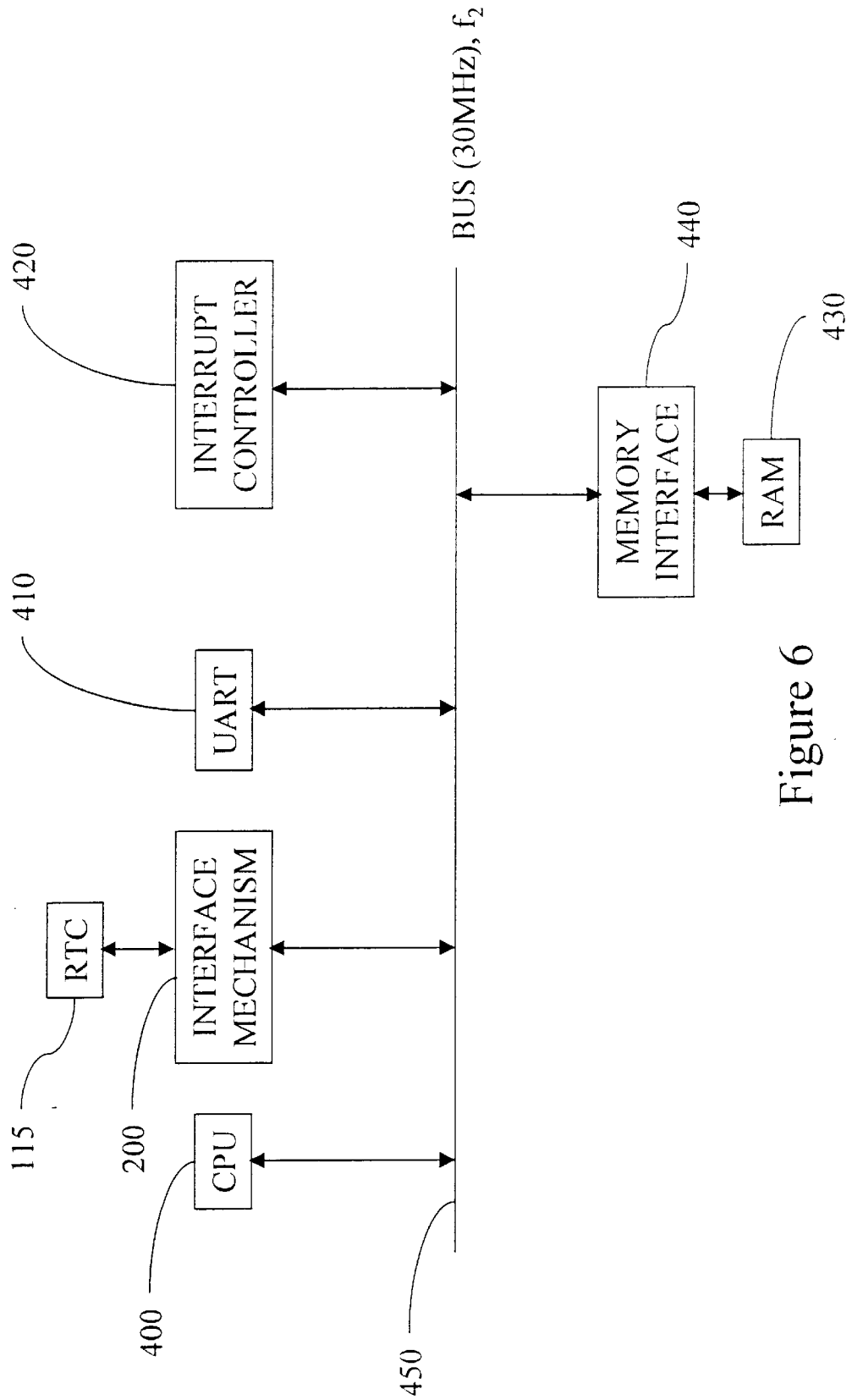
FIG. 6 is a block diagram of an example architecture of a data processing apparatus embodying the interface mechanism.

FIG. 6 illustrates a data processing apparatus embodying the interface mechanism. A number of master and slave units are connected to a system bus 450, for example a Central Processing Unit (CPU) 400, an interface mechanism 200, a memory interface 440, "Universal Asynchronous Receive and Transmit" (UART) logic unit 410 for receiving and transmitting serial data, and an interrupt controller 420. Real-time clock 115 is connected to the interface mechanism 200. Random Access Memory (RAM) 430 may be connected to the memory interface 440.

Control and data signals are passed between the units using the system bus 450. Access to the system bus 450 is controlled by arbiter logic (not shown).

When requested, the updated absolute real-time clock value $R_{f2}$ may be output by the interface mechanism 200 onto the system bus 450.

The CPU 400 may issue a control signal $CTL_{f2}$ onto the system bus along with an update value $W_{f2}$ to be received by the interface mechanism 200. The updated absolute real-time clock value $R_{f2}$ 2 may thereafter be output by the interface mechanism 200 onto the system bus 450 when requested. Data and control signals of bus 450 are timed by the clock signal $CLK_{f2}$.

Although particular embodiments have been described herein, it will be appreciated that the invention is not limited thereto and that many modifications and additions thereto may be made within the scope of the invention. For example, various combinations of the features of the following dependent claims can be made with the features of the independent claims without departing from the scope of the present invention.

I claim:

1. An interface mechanism for interfacing a real-time clock operating at a first frequency with a data processing circuit operating at a second frequency comprising:

a first input for receiving a relative real-time clock value from the real-time clock;

a second input for receiving an update value from the data processing circuit specifying a desired value for the real-time clock;

update logic for producing an absolute real-time clock value, the update logic being arranged in response to receipt of the update value to generate an offset value derived from the relative real-time clock value and the update value, the offset value then being applied to the relative real-time clock value to produce an updated absolute real-time clock value; and an output for issuing the updated absolute real-time clock value, wherein: the offset value is derived by calculating the difference between the relative real-time clock value and the update value; and the updated absolute real-time clock value is produced by calculating the difference between the relative real-time clock value and the offset value.

2. The interface mechanism of claim 1 wherein the update logic further comprises:

a first arithmetic unit for generating the offset value by subtracting the update value from the relative real-time clock value; and a second arithmetic unit for generating the updated absolute real-time clock value by subtracting the offset value from the relative real-time clock value.

3. The interface mechanism of claim 2 wherein the update logic is triggered to perform an update of the absolute real-time clock value in response to a control signal received from the data processing circuit in addition to the update value, the offset value being derived in a second frequency clock cycle following receipt of the control signal, and the updated absolute real-time clock value being produced in the next occurring second frequency clock cycle.

4. The interface mechanism of claim 3 wherein the update logic further comprises:

a state machine for receiving the control signal and a second frequency clock signal wherein:

in response to the control signal, a first signal is issued by the state machine during a second frequency clock cycle to cause the first arithmetic unit to generate the offset value; and in response to the next occurring second frequency clock cycle, a second signal is issued by the state machine causing the second arithmetic unit to generate the updated absolute real-time clock value.

5. The interface mechanism of claim 4 wherein the update logic further comprises:

a first register for storing and outputting to the first arithmetic unit the update value from the data processing circuit in response to the first signal from the state machine; and a second register for storing and outputting to the second arithmetic unit the offset value generated by the first arithmetic unit in response to the second signal.

6. The interface mechanism claim 1 further comprising:

sync logic for synchronising the relative real-time clock value generated by the real-time clock with the second frequency producing a resynchronized relative real-time clock value, wherein the update logic receives the resynchronised relative real-time clock value.

7. A method of interfacing a real-time clock operating at a first frequency with a data processing circuit operating at a second frequency comprising the steps of:

receiving a relative real-time clock value from the real-time clock;

receiving an update value from the data processing circuit specifying a desired value for the real-time clock;

producing an updated absolute real-time clock value by generating an offset value derived from the relative real-time clock value and the update value and by applying the offset value to the relative real-time clock value; and issuing the updated absolute real-time clock value, wherein: the offset value is derived by calculating the difference between the relative real-time clock value and the update value; and the updated absolute real-time clock value is produced by calculating the difference between the relative real-time clock value and the offset value.

8. The method of claim 7 wherein the step of producing the updated absolute real-time clock value comprising the steps of:

storing the update value in response to a control signal;

generating the offset value in a second frequency clock cycle following receipt of the control signal by subtracting the update value from the relative real-time clock value;

storing the offset value; and generating the updated absolute real-time clock value in the next occurring second frequency clock cycle by subtracting the offset value from the relative real-time clock value.

9. A computer-readable medium having stored thereon a plurality of instructions, the plurality of instructions including instructions which, when executed by an interface mechanism, cause the interface mechanism to implement a method for interfacing a real-time clock operating at a first frequency with a data processing circuit operating at a second frequency the method comprising the steps of:

receiving a relative real-time clock value from the real-time clock;

receiving an update value from the data processing circuit specifying a desired value for the real-time clock;

producing an updated absolute real-time clock value by generating an offset value derived from the relative real-time clock value and the update value and by applying the offset value to the relative real-time clock value; and issuing the updated absolute real-time clock value, wherein: the offset value is derived by calculating the difference between the relative real-time clock value and the update value; and the updated absolute real-time clock value is produced by calculating the difference between the relative real-time clock value and the offset value.

* * * * *